US009193631B2

(12) United States Patent
Marlin et al.

(10) Patent No.: US 9,193,631 B2
(45) Date of Patent: Nov. 24, 2015

(54) FUSED AND COATED SILICA GRAINS

(75) Inventors: Samuel Marlin, Plan d'Orgon (FR);
Sylvain Petigny, Velleron (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 605 days.

(21) Appl. No.: 12/933,236

(22) PCT Filed: Mar. 19, 2009

(86) PCT No.: PCT/FR2009/050471
§ 371 (c)(1),
(2), (4) Date: Oct. 13, 2010

(87) PCT Pub. No.: WO2009/127796
PCT Pub. Date: Oct. 22, 2009

(65) Prior Publication Data
US 2011/0053478 A1    Mar. 3, 2011

(30) Foreign Application Priority Data

Mar. 21, 2008    (FR) ...................... 08 51831

(51) Int. Cl.
| B24D 3/02 | (2006.01) |
| C09C 1/68 | (2006.01) |
| C09K 3/14 | (2006.01) |
| C04B 35/628 | (2006.01) |
| C04B 35/109 | (2006.01) |
| C04B 35/111 | (2006.01) |
| C04B 35/117 | (2006.01) |
| C04B 35/119 | (2006.01) |
| C04B 35/626 | (2006.01) |

(52) U.S. Cl.
CPC ......... C04B 35/62807 (2013.01); C04B 35/109 (2013.01); C04B 35/117 (2013.01); C04B 35/119 (2013.01); C04B 35/1115 (2013.01); C04B 35/62665 (2013.01); C04B 2235/3201 (2013.01); C04B 2235/3206 (2013.01); C04B 2235/3208 (2013.01); C04B 2235/3217 (2013.01); C04B 2235/3232 (2013.01); C04B 2235/3241 (2013.01); C04B 2235/3244 (2013.01); C04B 2235/3272 (2013.01); C04B 2235/3418 (2013.01); C04B 2235/402 (2013.01); C04B 2235/5427 (2013.01); C04B 2235/72 (2013.01); C04B 2235/721 (2013.01)

(58) Field of Classification Search
None
See application file for complete search history.

(56) References Cited

U.S. PATENT DOCUMENTS

| 3,029,160 A * | 4/1962 | Van Der Beck, Jr. ............ 51/308 |
| 3,181,939 A | 5/1965 | Marshall et al. |
| 3,525,600 A * | 8/1970 | Hideaki et al. .................. 51/295 |
| 3,891,408 A | 6/1975 | Rowse et al. |
| 3,923,691 A * | 12/1975 | Braithwaite et al. ............ 502/10 |
| 3,993,119 A | 11/1976 | Scott |
| 4,457,767 A | 7/1984 | Poon et al. |
| 4,913,708 A | 4/1990 | Kalinowski |
| 5,042,991 A | 8/1991 | Kunz et al. |
| 5,085,671 A | 2/1992 | Martin et al. |
| 5,213,591 A * | 5/1993 | Celikkaya et al. ............... 51/293 |
| 5,551,963 A * | 9/1996 | Larmie ........................... 51/307 |
| 5,633,084 A | 5/1997 | Hiraiwa et al. |
| 6,015,442 A | 1/2000 | Alary |
| 6,258,137 B1 | 7/2001 | Garg et al. |
| 6,287,353 B1 | 9/2001 | Celikkaya |
| 6,861,112 B2 * | 3/2005 | Morris et al. ............... 428/32.21 |
| 7,576,022 B2 | 8/2009 | Marlin |
| 2002/0157535 A1 * | 10/2002 | Kanazirev et al. ................ 95/96 |
| 2003/0134742 A1 * | 7/2003 | Kanazirev et al. ............. 502/300 |
| 2004/0097631 A1 * | 5/2004 | Morris et al. .................. 524/492 |
| 2006/0024434 A1 * | 2/2006 | Wang et al. .................... 427/212 |
| 2006/0032146 A1 * | 2/2006 | Partch et al. ..................... 51/298 |
| 2006/0134421 A1 | 6/2006 | Zeiringer et al. |
| 2007/0298259 A1 * | 12/2007 | Matsumoto .................... 428/407 |
| 2008/0171289 A1 * | 7/2008 | Maehashi .................. 430/286.1 |
| 2008/0193318 A1 * | 8/2008 | Carty ................................ 419/2 |
| 2008/0269042 A1 * | 10/2008 | Carty .............................. 501/119 |

FOREIGN PATENT DOCUMENTS

| EP | 0 417 729 A2 | 3/1991 |
| EP | 0 856 037 | 8/1998 |
| EP | 1 149 060 | 10/2001 |
| EP | 1 613 709 | 1/2006 |
| JP | 1-271477 | 10/1989 |
| JP | A-7-286166 | 10/1995 |
| JP | A-2003-510418 | 3/2003 |
| JP | 2006-186381 | 7/2006 |
| JP | A-2006-186381 | 7/2013 |
| WO | WO 01/23323 A1 | 4/2001 |
| WO | WO 01/29145 A1 | 4/2001 |

(Continued)

OTHER PUBLICATIONS

Treibacher Schleifmittel: A Full Range of Products: Special Fused Aluminum Oxide: ZK 40 eutectic alumina zirconia (40%), angular grain shape (Jul. 27, 2013) http://www.treibacher-schleifm.com/bonded.html.*

(Continued)

Primary Examiner — Melvin C Mayes
Assistant Examiner — Ross J Christie
(74) Attorney, Agent, or Firm — Oliff PLC

(57) ABSTRACT

A coated grain is provided with a fused base grain at least partially covered with a coating that includes silica. The base grain includes more than 40% of alumina as a percentage by weight based on the weight of the base grain.

25 Claims, No Drawings

(56) References Cited

FOREIGN PATENT DOCUMENTS

| WO | WO 2004/094554 A1 | 11/2004 |
|---|---|---|
| WO | WO 2005/035199 A1 | 4/2005 |
| WO | WO 2006/032982 A1 | 3/2006 |

OTHER PUBLICATIONS

Washington Mills, "Particle Size Conversion Chart—FEPA" (Mar. 15, 2014) http://www.washingtonmills.com/guides/grit-sizes-fepa/particle-size-conversion-chart-fepa/.*

International Search Report for International Patent Application No. PCT/FR2009/050471, mailed on Sep. 17, 2009.

Mar. 7, 2013 European Proceeding issued in European Application No. 09733596.2 (with English Translation).

May 14, 2013 Office Action issued in Japanese Application No. 2011-500275 (with English translation).

Jun. 9, 2014 Office Action issued in Japanese Application No. 2011-500275 (with partial English Translation).

Korean Office Action dated Jan. 30, 2015 with its English translation.

* cited by examiner

FUSED AND COATED SILICA GRAINS

FIELD OF THE INVENTION

The present invention relates to fused grains such as fused grains of alumina, alumina-zirconia grains or fused grains containing magnesium oxide. The invention also relates to an abrasive tool including grains in accordance with the invention and to a method of producing grains of the invention.

PRIOR ART

Abrasive tools are generally classified according to the mode of forming the ceramic grains that constitute them: free abrasives, which are projected or suspended without a support; applied abrasives, where the grains are fixed to a support of a cloth, paper or polymeric film type; and bonded abrasives in the form of circular wheels, rods, etc.

With bonded abrasives, the abrasive grains are pressed with an organic binder, for example a phenolic resin or glassy binder, for example with a binder constituted by oxides, in particular a silicate binder. Said grains must themselves have good mechanical properties as regards abrasion, in particular high toughness and/or hardness, and give rise to good cohesion with the binder (solidity of the interface).

Currently, various families of abrasive grains exist that cover a wide range of applications and performance; grains synthesized by melting starting materials, termed "fused grains" offer an excellent quality/production cost compromise.

In the present description, unless otherwise indicated, all of the compositions of a grain are given as the percentage by weight based on the total weight of the grain.

In the fused grain range, materials based on alumina and zirconia have been known since U.S. Pat. No. 3,181,939. Said grains are generally composed of 10% to 60% of zirconia, 0 to 10% of an additive, with the complement being alumina. In practice, the amount of zirconia in commercial products is about 25%, i.e. about the value for the alumina-zirconia eutectic at approximately 42% zirconia, generally in the range 35% to 50%, as described in U.S. Pat. No. 3,891,408.

U.S. Pat. No. 4,457,767 also describes fused grains. An example that may be mentioned are grains sold by the supplier Saint-Gobain (France) with the trade name NZPlus®. Said grains typically contain 39% by weight of zirconia and 0.8% of $Y_2O_3$, less than 0.5% of impurities, with the complement being alumina. Mixtures of said grains are widely used for applied abrasives or for abrasive wheels with an organic binder, especially in operations where a large quantity of material is removed (rough grinding, cut-off grinding, etc), especially on stainless steel.

Further, EP-A-0 1 613 709 describes grains comprising several percent of MgO, the complement being $Al_2O_3$. Said alumina-containing grains containing magnesium oxide are produced by fusing the starting materials. The fused material is then cooled, preferably rapidly, to encourage the production of fine, orientated structures, for example using a device for casting between thin metal plates such as that disclosed in U.S. Pat. No. 3,993,119. The cooled material is finally milled, for example using a roller grinding mill, then sieved and classified into series of grain size distributions or "grits" that comply with precise standards, for example FEPA.

U.S. Pat. No. 5,042,991 describes a coating obtained from hydrophobic silica in suspension in a non-aqueous liquid.

WO-A-2006/032 982 describes a method of coating vitreophilic grains. Alumina is not a vitreophilic material.

In order to obtain better adhesion of abrasive grains with the binder, it is known to apply a coating to their surface, for example based on magnesium or manganese oxide (U.S. Pat. No. 4,913,708) or based on alumina hydrate and sodium silicate (EP-A-0 856 037). However, said coatings may suffer from disadvantages, in particular problems with toxicity for manganese oxide or premature ageing for hydrated alumina or sodium silicate due to their hygroscopic properties.

The application of silica to the surface of abrasive grains has also been recommended, in EP-A-0 417 729, but for sintered grains produced by a sol-gel route and intended for vitrified wheels and not for fused grains.

The modification of the performance of grains induced by application of a coating may, however, be very different depending on whether the grains are fused or sintered. Without being able to explain it theoretically, EP-A-0 417 729 indicates that applying the same treatments in the same manner to alumina-containing abrasive grains and using a vitreous binder results in abrasive tools that do not present the same performance on milling, depending on whether the grains are produced by a sol-gel route or otherwise.

Further, Japanese patent application JP-63-98299 describes a method of producing a coating based on silica with a flaky morphology. That method comprises immersing the base grains in a silica sol, eliminating the excess silica, then heat treating at high temperature. That patent application indicates that it is generally difficult to use colloidal silica to coat abrasive grains that are aggregates of fine particles.

Finally, the methods employed to coat fused grains are generally complex and expensive.

There is a constant need for novel abrasive grains presenting excellent adhesion with binders, especially organic binders, and/or with high toughness. One aim of the invention is to respond to this need.

There is also a need for a novel method of producing such abrasive grains in an effective manner and at reduced cost. The invention also aims to respond to this need.

SUMMARY OF THE INVENTION

The invention proposes a coated grain comprising a fused base grain at least partially or even completely covered with a coating comprising silica, the base grain comprising more than 40% of alumina, as a percentage by weight based on the weight of the base grain.

As can be seen in more detail in the remainder of the description, such a silica coating makes it possible to obtain good impact strength and fracture strength and/or good adhesion with the binder.

A grain according to the invention may in particular also comprise one or more of the following optional characteristics:

the coating comprises more than 95% of silica, as a percentage by weight based on the weight of the coating;
the silica is hydrophilic;
the weight of the coating represents more than 0.01%, more than 0.1% and/or less than 2%, less than 0.75%, or even less than 0.3% of the weight of the base grain;
the coating covers substantially all of the surface of said base grain;
the coating has no cracks or flakes;
the coating is in contact with the surface of the base grain, with no intermediate layer separating said coating and said surface;
the base grain comprises at least 1% of zirconia, magnesia or a mixture of zirconia and magnesia, as a percentage based on the weight of the base grain;

the base grain has one of the following chemical analyses, as percentages by weight for a total of 100%:
$Al_2O_3$: 45-65%
$ZrO_2+HfO_2$: 35-50%
Others: 0-12% or
$Al_2O_3$: 65-80%
$ZrO_2+HfO_2$: 15-30%
Others: 0-12.0% or
$Al_2O_3$: 92.0-98.5%
MgO: 1.5-6.5%
Others: <2.0%;
the total weight of additive in the composition of the base grain is less than 10%.

The invention also provides a mixture of grains comprising coated grains in accordance with the invention, the size of said coated grains being greater than 45 μm [micrometers], greater than 400 μm or greater than 500 μm and/or smaller than 3.35 mm [millimeters] or smaller than 2 mm or smaller than 600 μm.

The invention also provides an abrasive tool comprising abrasive grains bound by a binder, agglomerated or deposited on a support, at least a portion of said abrasive grains being in accordance with the invention. The binder may in particular be an organic binder.

The invention also provides a method of producing coated grains comprising the following steps in succession:
1) obtaining or producing fused base grains, in particular fused base grains comprising more than 40% of alumina, as a percentage by weight based on the weight of the base grain;
2) at least partially coating said base grains with a suspension, preferably aqueous, containing silica;
3) optionally, drying the base grains wetted by said suspension in order to form a coating based on silica.

In particular, a method in accordance with the invention may also include one or more of the following optional characteristics:
before step 2), the fused base grains undergo a heat treatment step, termed "prior" treatment, in particular carried out at a temperature of greater than 600° C., or even greater than 800° C., or even greater than 1000° C. and/or smaller than 1550° C., or even smaller than 1350° C., or even smaller than 1250° C. The duration of the prior heat treatment may, for example, be greater than 30 minutes, or even greater than 1 hour, or greater than 3 hours and/or smaller than 10 hours. Alternatively, the fused base grains may not undergo any heat treatment step prior to step 2);
in step 2), the base grains are mixed with a quantity of suspension greater than 0.5 g [gram], greater than 0.75 g, or even greater than 1.0 g and/or smaller than 5 g, smaller than 4 g, smaller than 3 g, or even smaller than 2 g of suspension per 100 g of base grains. The silica suspension may have a concentration smaller than 25%, or even smaller than 10%, or even smaller than 5% of silica;
after optional step 3), the method comprises a heat treatment step 4), said heat treatment being carried out at a temperature greater than 100° C., greater than 200° C., greater than 300° C. and/or smaller than 1550° C., smaller than 1500° C., smaller than 1350° C., smaller than 1000° C., or even smaller than 500° C. or smaller than 450° C. Said heat treatment is carried out for a period greater than 30 minutes, greater than 1 hour and/or smaller than 24 hours or smaller than 10 hours;
the fused base grains do not undergo any intermediate steps between step 2) and step 3) or step 4);
the method is adapted such that the coated grains obtained at the end of step 3) or, if appropriate, step 4), are in accordance with the invention.

DEFINITIONS

For the purposes of clarity, the term "coated grain" is used to denote a grain comprising a "base grain" of a fused material and a coating comprising silica at least partially covering said base grain.

The term "coating" means a layer of solid material extending at the surface of a base grain. The coating may penetrate into any pores at the surface of the base grain. However, a coating is defined by an interface with the base grain marking a break in the chemical composition.

The term "fused grain" means a grain obtained using a method comprising solidification of a molten substance by cooling.

A "molten substance" is a mass that must be contained in a receptacle in order to retain its shape. A molten substance is generally liquid. However, it may contain solid particles, but in insufficient quantity for it to be able to bring structure to said mass.

The term "mixture of grains" means a castable mixture of grains, i.e. not having intrinsic rigidity. For small size grains, the term "powder" is conventionally used.

The coated grains of the invention may be in the form of a mixture of grains, in particular in the form of a mixture of grains that are ready to use as a starting material for the production of an abrasive tool or in a form where said grains are immobilized relative to each other, for example because they are fixed on a cloth or bonded together in order to constitute a rigid mass, in particular to constitute a bonded abrasive.

The term "colloidal suspension of silica" conventionally means a suspension of silica particles in a liquid, for example in an aqueous medium, the particles having dimensions of a few nanometers to several hundred nanometers depending on whether or not they are agglomerated.

Conventionally, the "size" of a base grain or a coated grain corresponds to the minimum mesh of a standard sieve through which said grain can pass.

The "size" of a particle of silica in suspension corresponds to the size given conventionally by characterization of the grain size distribution carried out with a laser granulometer, for example of the Partica LA-950 type from the supplier HORIBA.

A reference to grits or to the FEPA standard means a reference to FEPA Standard 42-GB-1984.

The oxide content of the grains is relative to the overall quantities of each of the corresponding chemical elements expressed in the form of the most stable oxide, as is conventional in the industry; thus, sub-oxides are included and possibly nitrides, oxynitrides, carbides, oxycarbides, carbonitrides, or even metallic species of the elements mentioned above.

When a chemical composition of a fused base grain is described, "Others" denotes all of the compounds that are not explicitly mentioned elsewhere, and in particular impurities and "additives".

The term "impurities" means inevitable constituents that are unintentionally and necessarily introduced with the starting materials or resulting from reactions with those constituents. Impurities are constituents that are not necessary, but are merely tolerated. As an example, the compounds forming part of the group formed by oxides, nitrides, oxynitrides, carbides, oxycarbides, carbonitrides and metallic species of sodium and other alkalis, iron, vanadium and chromium are impurities. Hafnium oxide, naturally present in sources of zirconia in quantities of less than 2%, is not considered to be an impurity when the desired product has to include zirconia of zirconia and hafnium oxide. Residual carbon, expressed as C, forms part of the impurities of the grains of the invention.

The term "additive" encompasses all additives used for the production of fused alumina or alumina-zirconia grains, in particular zirconia stabilizers, and in particular yttrium oxide and titanium oxide. It also includes oxides of magnesium, calcium and other rare earth oxides, in particular that of neodymium, but also those of lanthanum, cerium, dysprosium and erbium. The term "additive" also includes mixtures of these species. Preferably, the total quantity of additive in the composition of the base grains is smaller than 10%, or even smaller than 5%, 3%, 1%, 0.8%, 0.5% or 0.2%.

Other characteristics and advantages of the present invention become apparent from the following detailed description.

DETAILED DESCRIPTION

The base grain may have different compositions; in particular, it may be constituted by alumina, especially α, alumina-zirconia or alumina-magnesia, provided that it comprises at least 40% by weight of alumina.

The base grain may include a quantity by weight of alumina greater than 45%, or even greater than 65% or even greater than 92% and/or smaller than 98.5%, or even smaller than 80%, or even smaller than 65%.

Preferably, the base grain includes at least 1% of zirconia, magnesia or a mixture of zirconia and magnesia.

The base grain may comprise a quantity of zirconia ($ZrO_2$+$HfO_2$) greater than 15%, greater than 20%, or even greater than 35% and/or smaller than 50%, or even smaller than 30%. In a particular embodiment, the base grain contains no zirconia.

The base grain may also include magnesia (MgO), the weight content of magnesia preferably being greater than 1.5%, 2.2%, 2.3%, 2.45% and/or smaller than 6.5%, 4.0%, or even 2.5%.

In particular, the base grain may be a grain such as that forming the subject matter of patent application WO/2004/094554.

In one embodiment, the fused base grain has the following chemical analysis; the percentages are given by weight for a total of 100%:
$Al_2O_3$: 45-65%
$ZrO_2$+$HfO_2$: 35-50%
Others: 0-12.0%

In another embodiment, the fused base grain has the following chemical analysis; the percentages are given by weight for a total of 100%:
$Al_2O_3$: 65-80%
$ZrO_2$+$HfO_2$: 15-30%
Others: 0-12.0%

In another embodiment, the fused base grain has the following chemical analysis; the percentages are given by weight for a total of 100%:
$Al_2O_3$: 92.0-98.5%
MgO: 1.5-6.5%;
Others: <2.0%.

The total quantity of impurities in the base grains is preferably smaller than 0.5%, or even 0.4%. preferably, the quantity of impurities is smaller than 0.1%.

Silica and sodium oxide in particular are known to be prejudicial in a fused base grain, and their respective quantities have to be limited to traces in the base grain, introduced as impurities into the starting materials. The presence of silica in fact leads to the formation of a glassy face that modifies the abrasive Properties and the hardness of the fused base grain. The presence of sodium oxide, even in small quantities, leads to the formation of beta alumina. This crystallographic form of alumina reduces the abrasive properties of the grains. Preferably, $Na_2O$<0.1%, or even $Na_2O$<0.05%.

The quantities of CaO, $TiO_2$, $Fe_2O_3$ or $Cr_2O_3$ in the base grain are each preferably less than 0.5%, more preferably less than 0.3%.

The residual carbon may be less than 800 ppm [parts per million], less than 500 ppm, or even less than 250 ppm, or even less than 200 ppm, which corresponds to reducing fusion conditions.

Preferably, the fused base grains have a porosity, measured by helium pycnometry, of less than 3%.

Preferably, the weight of the coating is greater than 0.01%, or even greater than 0.03%, or even greater than 0.1% and/or smaller than 2%, or even smaller than 0.75%, or even smaller than 0.3%, as a percentage by weight based on the base grain.

The coating may comprise more than 50%, or even more than 80%, more than 90%, or more than 95% of silica. The coating may even be constituted by 100% of silica, as a percentage by weight based on the weight of the coating.

Without being limiting, it is preferable for the coating to extend in a substantially uniform manner around the base grain. In a particular embodiment, the coating may substantially cover all of the surface of the base grain.

The coating may not have cracks or flakes, especially when it is applied in accordance with step 2) of the production method described below.

Prior art fused grains may comprise, as impurities, quantities of silica corresponding to the quantities of silica of a coated grain of the invention. The coated grains of the invention are, however, distinguished from prior art grains in that they have a coating with a silica content that is much higher than the silica content of fused base grains.

In one embodiment, the coating is in contact with the surface of the base grain, i.e. is not separated therefrom by an intermediate layer.

The silica is preferably hydrophilic, i.e. can be moistened with water. Silica is naturally hydrophilic and it is normally necessary to treat it specifically to render it hydrophobic.

The silica of the coating may be amorphous, partially crystalline, or even completely crystalline.

The invention also provides a mixture of grains comprising or even being constituted by coated grains of the invention.

Preferably, the grains coated with a mixture of grains in accordance with the invention have a grit greater than grit 4, greater than grit 12, greater than grit 16 and/or less than grit 220, less than grit 120, or less than grit 80.

Preferably, the size of the coated grains is greater than 45 μm, 150 μm, 300 μm, 400 μm, 500 μm and/or smaller than 3.35 mm, 2.8 mm, 2 mm, 1.4 mm, 1 mm, 850 μm, or even 600 μm.

The invention also provides an abrasive tool comprising abrasive grains bonded by a binder and agglomerates, for example in the form of a wheel, or deposited on a support, for example deposited as a layer on a flexible support, said tool being remarkable in that at least a portion, or even all of said abrasive grains are in accordance with the invention.

The abrasive tool may in particular be a grinding wheel, a high precision wheel, a saw gumming wheel, a cut-off wheel, a solid-machining wheel, a fettling or roughing wheel, a regulating wheel, a portable wheel, a foundry wheel, a drill wheel, a mounted wheel, a cylindrical wheel, a cone wheel, a disk wheel or a segmented wheel, or any other type of wheel.

The methods of producing such abrasive tools are well known.

The bonded abrasive tools may be formed by pressing in the form of a mixture of abrasive grains and a binder.

In an abrasive tool of the invention, the binder may be vitrified (for example a binder constituted by oxides, essentially silicates), or organic. An organic binder is well suited and preferred.

The binder may in particular be a thermoset resin. It may be selected from the group constituted by phenolic, epoxy, acrylate, polyester, polyimide, polybenzimidazole, polyurethane, phenoxy, phenol-furfural, analine-formaldehyde, urea-formaldehyde, cresol-aldehyde, resorcinol-aldehyde, urea-aldehyde, or melamine-formaldehyde resins, and mixtures thereof.

Normally, the binder represents in the range 2% to 60%, preferably in the range 20% to 40% by volume of the mixture.

The binder may also incorporate organic or inorganic fillers, such as inorganic fillers that may be hydrated (for example aluminum trihydrate or boehmite) or not hydrated (for example molybdenum oxide), cryolite, a halogen, fluorspar, iron sulfide, zinc sulfide, magnesia, silicon carbide, silicon chloride, potassium chloride, manganese dichloride, potassium or zinc fluoroborate, potassium fluoroaluminate, calcium oxide, potassium sulfate, a copolymer of vinylidene chloride and vinyl chloride, polyvinylidene chloride, polyvinyl chloride, fibers, sulfides, chlorides, sulfates, fluorides, and mixtures thereof. The binder may also contain reinforcing fibers such as glass fibers.

The invention also provides a method of producing coated grains comprising the following steps in succession:
1) obtaining or producing fused base grains;
2) at least partially coating said base grains with a suspension containing silica;
3) optionally, drying the base grains wetted by the suspension;
4) optional heat treatment.

As can be seen in more detail in the remainder of the description, this method means that the coated grains of the invention can be produced in a very simple manner and they have both good impact strength and good adhesion with binders, in particular with organic binders.

In step 1), the fused base grains may be produced using any conventional method of producing fused grains of alumina or alumina-zirconia, in particular using a short arc with a melting energy before casting of at least 1500 kWh [kilowatt-hours] per (metric) tonne of starting materials. The fusion conditions may be such that the base grains have a maximum carbon content of 800 ppm. In particular, the base grains may be produced using a method comprising the following steps in succession:
a) mixing the starting materials;
b) fusing, conventionally in an electric furnace, said mixed starting materials until a molten material is obtained;
c) cooling said molten material by quenching, preferably such that the molten material is completely solidified in less than 3 minutes, until a solid mass is obtained;
d) milling said solid mass to obtain molten base grains, and optional grain size classification of said base grains.

The form of the grains can vary and can be selected as a function of the applications.

In one embodiment, no intermediate layer is applied to the fused base grains before step 2).

However, the base grains may be washed prior to step 2). Said pre-washing may be carried out with water or using an aqueous acidic solution, for example hydrochloric acid.

In one embodiment, the fused base grains do not undergo a heat treatment step prior to step 2). Advantageously, the method is simplified thereby.

In one embodiment, the heat treatment prior to the end of covering step 2) is the only operation intermediate between step 1) and step 2).

In another embodiment, the fused base grains, in contrast, undergo a heat treatment step prior to step 2). Said prior heat treatment may in particular be carried out at a temperature of more than 600° C., or even more than 800° C., or even more than 1000° C. and/or less than 1550° C. or even less than 1350° C. or even less than 1250° C.

Said heat treatment may be carried out in air, for example at atmospheric pressure.

Advantageously, said treatment can adjust the degree of toughness and friability of the base grain before producing said coating.

In step 2), the base grains are at least partially covered with a suspension containing silica.

Preferably, the base grains are mixed with a limited quantity of suspension, preferably greater than 0.5 g, greater than 0.75 g, or even greater than 1.0 g and/or smaller than 5 g, smaller than 4 g, smaller than 3 g, smaller than 2 g of suspension per 100 g of grains. A proportion by weight of 1 g of suspension per 100 g of base grains is well suited. Such quantities of suspension can produce good coverage of the base grains by the silica suspension.

The mixture thus obtained has the consistency of "wet sand" and may advantageously be dried without undergoing intermediate treatment. Advantageously again, after drying, the coated grains do not adhere to each other or adhere so weakly that they can readily be separated without milling.

The silica suspension may have a concentration of less than 25%, or even less than 10%, or even less than 5% of silica.

The suspension of silica is preferably used in proportions meaning that a percentage by weight of silica of 0.01%, 0.03% or 0.05% or more and/or 5%, 3%, 2%, 1%, 0.75%, 0.3% or even 0.1% or less, based on the base grains, can be deposited on the base grains.

The suspension may in particular be a colloidal suspension of silica. It may contain additives such as surfactants, wetting agents, or complexing agents.

Preferably, the colloidal suspension is nanometric, i.e. comprises particles of silica with a dimension in the range 2 to 200 nanometers. Advantageously, this means that there are a large number of silica particles and thus a large coated surface area at low concentrations by weight.

The colloidal silica suspension, optionally aqueous, may be commercially available or it may be a suspension obtained by mixing with a solution of polyvinyl alcohol (PVA) and fumed silica.

The suspension may advantageously be applied simply by mixing with the base grains. On drying, in particular during a drying step 3), or during a heat treatment (step 4)), the liquid phase of the colloidal suspension evaporates off, leaving the silica on the surface of the particles.

In one embodiment, the production method does not include an intermediate step between step 2) and step 3) or step 4). In particular, it does not include a rinsing or washing or chemical treatment step.

In step 3), in order for the silica to adhere effectively to the fused base grains, drying is preferably carried out at a temperature of more than 60° C., preferably more than 80° C. and/or less than 200° C., preferably less than 140° C.

The grains may be subjected to a heat treatment (step 4)) at a temperature that is preferably greater than 100° C., 200° C., or even 300° C. or 350° C., and/or preferably smaller than 1550° C., 1350° C., 1000° C., 800° C., 600° C., or even 500° C. or 450° C., for a period that is preferably greater than 30 minutes, or even 1 hour, or even 2 hours and/or smaller than 24 hours, 10 hours, or even 8 hours or 6 hours.

A heat treatment at more than 450° C., more than 500° C. or more than 600° C. is also possible.

Preferably, the heat treatment carried out in step 4) is carried out on a powder of free grains, i.e. a powder in which the coated grains of the invention are not bonded to each other, in particular by means of a resin.

A heat treatment temperature of approximately 400° C. is particularly suitable. A producing method of the invention can thus produce remarkable performances with a heat treatment at a relatively reduced temperature (in particular for AZ grains and for Al—MgO grains that have undergone a prior heat treatment).

The heat treatment can improve adhesion and the quality of the interface between the base grain and the coating.

In particular, the base grain may be produced using the method described in patent application WO/2004/094554. In one implementation, said method comprises a step of calcining at more than 1250° C., or even 1350° C., 1400° C., preferably for more than 30 minutes.

In one implementation of the producing method of the present invention, step 2) for covering the base grain with a silica suspension is carried out before any heat treatment, in particular for the base grains described in patent application WO/2004/094554, before said calcining step. Step 4) of the producing method of the invention may thus advantageously act as the calcining step.

Advantageously, the calcining step can both considerably improve the performance of the base grain, as described in the patent application mentioned above, but at the same time it can improve the degree of fastening of the silica particles to the surface of the base grains.

After optional milling, coated grains that have, in accordance with the FEPA F standard, a grit in the range grit 12 to grit 220, more preferably in the range grit 16 to grit 120, may be selected. These grain sizes have proved to be highly effective in an abrasive application.

The production method of the invention is preferably adapted such that the coated grains obtained at the end of step 3) or step 4) are in accordance with the invention.

Finally, the invention provides a grain or a mixture of grains obtained using a producing method in accordance with the invention.

EXAMPLES

The following non-limiting examples are given with the aim of illustrating the invention.

The base grains used were produced from the following starting materials:
partially calcined Bayer® alumina with a soda content of less than 0.3%;
zirconia powder with a zirconia+hafnium content of greater than 98%;
oil coke;
aluminum metal chips.

The base grains were prepared using the conventional fusion method that is known to the skilled person.

The starting materials were firstly metered out so that the base grains could be produced.

The AZ base grains had the following chemical analysis, as percentages by weight: $Al_2O_3$: 75.0%, $ZrO_2+HfO_2$: 24.1%, $TiO_2$: 0.1%, $SiO_2$<0.2%, MgO: 0.05%, CaO: 0.07%, Others <0.8%. Crystallographic and microstructural analysis showed that all of the zirconia was combined with the alumina in the eutectic form; the complement of the alumina was in the form of alpha alumina.

The Al—MgO base grains had the following chemical analysis, as percentages by weight: $Al_2O_3$: 95.75%, MgO: 3.6%, $SiO_2$: 0.02%, CaO: 0.07%, Others: <0.6%.

A minimum 1% (up to 3%) of oil coke was added to these starting materials depending on the state of the furnace and approximately 0.5% to 5.5% of aluminum chips, as percentages by weight based on the starting charge.

The starting charge was then melted in a single phase electric arc furnace of the Heroult type with graphite electrodes, with a 0.8 m diameter furnace shaft, a voltage of 100 v to 150 V, an intensity of 1800 A to 2200 A and a specific supplied electrical energy of 1.8 kWh/kg of charge to 2.5 kWh/kg of charge.

The molten material was then cooled suddenly using a thin metal plate casting device such as that disclosed in U.S. Pat. No. 3,993,119. The fused grains were then milled and classified according to their granulometry. The fused grains with granulometries in the range grit 12 to grit 220 (FEPA F standard) were selected.

The selected grains were then washed with water and mixed with a colloidal suspension of silica in order to obtain a percentage, PS, of silica on the grains, as a percentage by weight relative to the weight of the base grains. Two silica suspensions were used: a suspension A obtained by mixing Aerosil 200 fumed silica sold by Degussa AG with a solution of polyvinyl alcohol (PVA), and a suspension C: CabOsperse 2020K supplied by Cabot and containing 20% of silica dispersed in an aqueous medium.

The mixture was then optionally heat treated (HTT: yes/no) at a temperature, Thtt, for two hours.

The Al—MgO grains of examples 1B, 2B and 3B underwent a heat treatment of 4 hours at 1500° C. prior to washing and mixing with the colloidal silica suspension.

In order to discern the mechanical properties of the grains, the tests described below were carried out.

Test A: Determination of Impact Strength and Fracture Strength

Test A was intended to determine the fraction of grains surviving in a given grain size bracket after stressing in a steel milling bowl. This test allowed the dynamic mechanical strength of the grains to be determined.

Prior to the test, the mixture of grains was initially sieved on a ROTAP® type vibrating sieve, an industry standard, in order to isolate the 1180/1400 μm fraction to represent the grain with number F16 (grit 16) according to the FEPA standard, the 1000/1180 μm fraction to represent the grain with number F20 (grit 20), the 710/850 μm fraction to represent the grain with number F24 (grit 24) and the 600/710 μm fraction to represent the grain with number F30 (grit 30).

The isolated grain size fraction then underwent deironing by magnetic separation in order to extract the metallic iron that is symptomatic of pollution due to milling.

For the test, a Sodemi rotary mill, routinely used for milling powders in order to analyze them chemically, was used. This mill was mounted in suspension on 8 springs and caused the motion of a hollow cylindrical bowl containing the grains to be tested, a puck and a free sliding ring. The cylindrical steel milling bowl (grade Z160 C 12) had the following dimensions: height 50 mm, internal diameter 139 mm. The puck was a solid cylinder (diameter 75 mm, height 45 mm) of steel with grade Z200 C 12 and weighed 1546 grams. The cylindrical ring (internal/external diameter 95/120 mm, height 45 mm) was formed from steel with the same grade, Z200 C 12, and weighed 1464 grams.

Test A for a sample thus comprised the following steps.
1. cleaning the bowl with compressed air;
2—introducing a sample weighing 25 grams of the grain size bracket of the test product between the wall of the milling bowl and the puck. The Sodemi mill is started up at its nominal rate (1400 rpm) for a period of 4 seconds. The milled product is then removed from the milling bowl using a brush (no. 50) to analyze the grain size distribution. The product is then sieved in a series of 70 mm diameter screens of a ROTAP® sieve for 3 minutes, with the following screens $T_i$:

| Grain no. | Tested | Sieves used (openings in μm) | | |
|---|---|---|---|---|
| (grit) | bracket | T1 | T2 | T3 |
| 16 | 1180/1400 μm | 1180 | 1000 | 500 |
| 20 | 1000/1180 μm | 1000 | 850 | 425 |
| 24 | 710/850 μm | 710 | 425 | 300 |
| 30 | 600/710 μm | 600 | 500 | 250 |

T1+T2+T3 is denoted as the sum of the refuse, by weight, from screens T1, T2 and T3 (for example with 1180 μm, 1000 μm and 500 μm openings in the 1180/1400 μm bracket). The value for the impact strength (test A), given as a percentage, corresponds to the value T1+T2+T3 of the test sample divided by the value T1+T2+T3 of the reference sample. Thus, the higher the value obtained for test A, the better the impact strength and fracture strength.

The reference sample is a sample washed with water that is equivalent to the test sample but wherein the grains have not been coated. The reference sample is thus a mixture of grains that is substantially identical to the mixture of the base grains, washed and not coated, of the test sample.

Test B: Determination of Adhesion Between Grains and Binder

Test B consists in measuring the modulus of rupture, MOR, of bars constituted by mixtures of the test grains bonded with a typical organic binder and wherein the composition can simulate the behavior of abrasive wheels. The MOR of said bars with dimensions of 100×25×10 mm was evaluated by three-point bending using the formula:

$$MOR(\text{in megapascals}) = (3FL)/(2e2l),$$

where
F: force in Newtons;
L: inter-axial separation of lower rollers in mm;
e: thickness of bar in mm;
l: width of bar in mm.

Small values for MOR mean a tendency of the grain/binder interface to rupture and friability of the abrasive wheels; they correspond to poor behavior in service.

The result obtained for test B, given as a percentage, was obtained by dividing the MOR of the test sample by the MOR for the corresponding reference sample (MOR of a bar formed from a mixture of base grains, washed, not coated, used to produce the test sample (same composition and same size as the base grains effectively used to production the test sample).

The results are shown in Table 1.

TABLE 1

| Example No | Composition of base grains | Size (μm) | Silica suspension | PS (%) | HTT | Thtt (° C.) | Test A (%) | Test B (%) |
|---|---|---|---|---|---|---|---|---|
| 1A | Al—MgO | 710/850 | C | 0.06 | Yes | 1500 | 99 | 130 |
| 1B | Al—MgO | 710/850 | C | 0.06 | Yes | 400 | 100 | 112 |
| 2A | Al—MgO | 600/710 | C | 0.06 | Yes | 1500 | 115 | 113 |
| 2B | Al—MgO | 600/710 | C | 0.06 | Yes | 400 | 118 | 108 |
| 3A | Al—MgO | 1000/1180 | C | 0.06 | Yes | 1500 | 111 | nd |
| 3B | Al—MgO | 1000/1180 | C | 0.06 | Yes | 400 | 112 | nd |
| 4 | AZ | 1180/1400 | C | 0.03 | Yes | 500 | 96 | 116 |
| 5 | AZ | 1180/1400 | C | 0.3 | Yes | 400 | 104 | nd |
| 6 | AZ | 1180/1400 | C | 0.75 | Yes | 400 | 104 | nd |
| 7 | AZ | 1180/1400 | C | 2.0 | Yes | 400 | 105 | nd |
| 8 | AZ | 1180/1400 | C | 0.03 | No | / | nd | 121 |
| 9 | AZ | 1180/1400 | C | 0.1 | Yes | 400 | 103 | 129 |
| 10 | AZ | 1180/1400 | A | 0.3 | Yes | 400 | 107 | nd |
| 11 | AZ | 1180/1400 | A | 0.03 | Yes | 500 | 93 | 123 |
| 12 | AZ | 1180/1400 | A | 0.03 | Yes | 600 | nd | 122 |
| 13 | AZ | 1180/1400 | A | 0.03 | Yes | 800 | 76 | 123 |

In Table 1, "nd" denotes "not determined".

The results show that the products of the invention that were tested exhibited improved behavior in test B and equivalent or improved behavior in test A.

It can be seen from Table 1 that prior heat treatment of the Al—MgO base grains could be avoided: the results of Example 1A were similar to those of Example 1B, and similarly for Examples 2A and 2B, and 3A and 3B. It is economically advantageous to obtain these improved grains with a single heat treatment.

For base grains other than Al—MgO, in particular for alumina-zirconia base grains, a heat treatment may, however, be advantageous.

Table 1 shows that advantageous effects, possibly on only one of the two tests A and B, were obtained with a percentage PS of silica on the base grains that was very low, in particular for values of PS of 0.03% or more.

Example 8 shows that a heat treatment is not always indispensable in obtaining an improvement in the adhesion of the grains.

A comparison of Examples 11 to 13 shows that for the AZ grains tested, raising the heat treatment temperature beyond 400° C. does not improve the results in test B. Furthermore, the results of test A are significantly degraded when this heat treatment temperature is increased. A heat treatment of less than 500° C. or even less than 450° C. appears to be preferable. Without wishing to be bound by this theory, the inventors explain this phenomenon by the fact that a heat treatment at too high a temperature, in particular for alumina-zirconia grains, could cause sintering of the silica coating accompanied by shrinkage and the appearance of cracks in the coating and/or phase transformations of the zirconia, affecting the properties of the grain.

With Al—MgO grains heat treated before application of the silica coating, a heat treatment at a temperature greater than 500° C. does not appear to be necessary.

Clearly, the present invention is not limited to the embodiments provided as illustrative examples.

The invention claimed is:

1. A coated abrasive grain comprising a fused base grain at least partially covered with a coating obtained from a colloidal suspension of silica, the coating being 100% hydrophilic silica by weight based on the weight of the coating, the base grain comprising more than 40% of alumina, as a percentage by weight based on the weight of the base grain; the coated grain having a size of greater than 45 μm, and the coated grain being obtained by a method comprising the following steps in succession:
   1) obtaining or producing fused base grains comprising more than 40% of alumina, as a percentage by weight based on the weight of the base grain;
   2) at least partially coating the base grains with a suspension containing hydrophilic silica to form base grains wetted by the suspension;
   3) drying the base grains wetted by the suspension in order to form said coating on the base grains, the base grains not undergoing any intermediate steps between step 2) and step 3), the base grain having one of the following chemical analyses, as percentages by weight for a total of 100%:
   $Al_2O_3$: 45-65%
   $ZrO_2+HfO_2$: 35-50%
   Others: 0-12%,
   or
   $Al_2O_3$: 65-80%
   $ZrO_2+HfO_2$: 15-30%
   Others: 0-12.0%,
   or
   $Al_2O_3$: 92.0-98.5%
   MgO: 1.5-6.5%
   Others: <2.0%.

2. A coated grain according to claim 1, wherein the coating is obtained from a suspension of aqueous colloidal hydrophilic silica.

3. A coated grain according to claim 1, wherein the weight of the coating represents more than 0.01% and less than 2% of the weight of the base grain.

4. A coated grain according to claim 1, wherein the weight of the coating represents more than 0.1% and less than 0.75% of the weight of the base grain.

5. A coated grain according to claim 1, wherein the weight of the coating represents less than 0.3% of the weight of the base grain.

6. A coated grain according to claim 1, wherein the coating has neither cracks nor flakes.

7. A coated grain according to claim 1, wherein the base grain comprises at least 1% of zirconia, magnesia or a mixture of zirconia and magnesia, as a percentage by weight based on the weight of the base grain.

8. An abrasive tool comprising abrasive grains bonded by a binder, agglomerated or deposited on a support, at least a portion of said abrasive grains being coated abrasive grains in accordance with claim 1.

9. A method of producing coated grains, each of said grains being coated abrasive grains in accordance with claim 1, the method comprising the following steps in succession:
   1) obtaining or producing fused base grains comprising more than 40% of alumina, as a percentage by weight based on the weight of the base grain;
   2) at least partially coating the base grains with a suspension containing hydrophilic silica to form base grains wetted by the suspension;
   3) drying the base grains wetted by the suspension in order to form a coating on the base grains, wherein
      the coating being 100% hydrophilic silica as a percentage by weight based on the weight of the coating, and
      the base grains not undergoing any intermediate steps between step 2) and step 3).

10. A method according to claim 9 further comprising, after step 3), a heat treatment step 4), said heat treatment being carried out at a temperature of greater than 100° C. and less than 1550° C.

11. A method according to claim 10, said heat treatment being carried out at a temperature of greater than 300° C. and less than 500° C.

12. A method according to claim 9, wherein the base grains undergo a prior heat treatment step before step 2) at a temperature of greater than 600° C. and less than 1550° C.

13. A method according to claim 12, said prior heat treatment being carried out at a temperature of greater than 800° C. and less than 1350° C.

14. A method according to claim 9, wherein the base grains do not undergo any heat treatment steps prior to step 2).

15. A method according to claim 9, wherein a heat treatment at a temperature in the range 200° C. to 1550° C. is carried out after drying the base grains wetted by the suspension.

16. A coated grain according to claim 1, wherein at step 1) of the method by which the coated grain being obtained the base grain is quenched.

17. A coated grain according to claim 1, wherein step 1) of the method by which the coated grain being obtained by further comprises cooling of a molten material by quenching such that the molten material is completely solidified in less than 3 minutes.

18. A coated grain according to claim 1, wherein step 1) of the method by which the coated grain being obtained by further comprises:
   a) mixing the starting materials;
   b) fusing said mixed starting materials until a molten material is obtained;
   c) cooling said molten material by quenching, such that the molten material is completely solidified in less than 3 minutes, until a solid mass is obtained;
   d) milling said solid mass to obtain molten base grains, and optional grain size classification of said base grains.

19. A coated grain according to claim 1, said base grain being covered in a substantially uniform manner with said coating.

20. A coated grain according to claim 1, wherein the coating is defined by an interface with the base grain that marks a break in the chemical composition of the coating.

21. A method according to claim 9, wherein at step 2) said base grains wetted by the suspension are coated in a substantially uniform manner.

22. A mixture of coated grains, including a plurality of coated abrasive grains according to claim 1, the size of said coated grains being greater than 45 μm.

23. A mixture according to claim 22, the size of said coated grains being greater than 400 μm.

24. A coated grain according to claim 1, wherein at step 2, the coating results from a mixing of the base grains with a quantity of suspension smaller than 5 g per 100 g of base grains, and being obtained by a method further comprising a step 4) successive to step 3) consisting in heat treating at a temperature greater than 100° C. and less than 450° C. for a period greater than 30 minutes.

25. A method according to claim 9, wherein step 1) of the method by which the coated grain being obtained by further comprises cooling of a molten material by quenching such that the molten material is completely solidified in less than 3 minutes, and wherein the base grains have one of the following chemical analysis, as percentages by weight for a total of 100%:
   $Al_2O_3$: 45-65%
   $ZrO_2+HfO_2$: 35-50%
   Others: 0-12%;
   or
   $Al_2O_3$: 65-80%
   $ZrO_2+HfO_2$: 15-30%
   Others: 0-12.0%;
   or
   $Al_2O_3$: 92.0-98.5%
   MgO: 1.5-6.5%
   Others: 2.0%; and
at step 2, the coating results from a mixing of the base grains with a quantity of suspension smaller than 5 g per 100 g of base grains, and
   said method further comprising a step 4) successive to step 3) consisting in heat treating at a temperature greater than 100° C. and less than 450° C. for a period greater than 30 minutes, the size of the coated grains being greater than 45 μm.

* * * * *